United States Patent [19]

Ushirokawa

[11] Patent Number: 5,450,445
[45] Date of Patent: Sep. 12, 1995

[54] METHOD AND ARRANGEMENT OF ESTIMATING DATA SEQUENCES TRANSMITTED USING VITERBI ALGORITHM

[75] Inventor: Akihisa Ushirokawa, Tokyo, Japan

[73] Assignee: NEC Corporation, Tokyo, Japan

[21] Appl. No.: 970,494

[22] Filed: Nov. 2, 1992

[30] Foreign Application Priority Data

Oct. 31, 1991 [JP] Japan .................................. 3-286051

[51] Int. Cl.$^6$ ............................................. H04L 27/06
[52] U.S. Cl. ..................................... 375/324; 375/349
[58] Field of Search ......................... 375/39, 80, 94, 99, 375/102; 371/43; 364/724.12

[56] References Cited

U.S. PATENT DOCUMENTS

| 4,631,735 | 12/1986 | Qureshi | 375/99 |
| 4,885,757 | 12/1989 | Provence | 375/96 |
| 5,081,651 | 1/1992 | Kubo | 375/94 |
| 5,272,726 | 12/1993 | Furuya et al. | 375/94 |

OTHER PUBLICATIONS

G. David Forney, Jr., "Maximum-Likelihood Sequence . . . Intersymbol Interference", IEEE Transactions on Information Theory, vol. IT-18, No. 3, May 1972, pp. 363-378.

Gottfried Ungerboeck, "Adaptive Maximum-Likelihood . . . Systems", IEEE Transactions on Communications, vol. Com-22, No. 5, May 1974, pp. 624-636.

Y. Furuya et al., "A Study of Blind Viterbi Equalization Algorithm", 1991 Spring Nat'l Assy of the Electronic, Information & Telecommunication Society of Japan, Paper No. A-141, 1991, pp. 1-141.

Hiroshi Kubo et al., "An Adaptive Maximum-Likelihood . . . Channels", 1990 Autumn Nat'l Assy of the Electronic, Information & Telecommunication Society of Japan, Paper No. B-283, Oct. 1990, pp. 2-283.

N. Seshadri, "Joint Data and Channel Estimation Using Fast blind Trellis Search Techniques", IEEE Globecom '90 Conference Record, Dec. 1990, pp. 1659-1663.

Akihisa Ushirokawa, "Reduced-State Blind Viterbi Equalizers", 1991 Autumn National Conference of the Electronic, Information & Telecom. of Society of Japan, Paper No. SB-4-2, Sep. 1991, pp. 2-420-2-421.

Kazuhiko Fukawa et al., "Adaptive RLS-MLSE for Digital Mobile Radio", 1991 Autumn Nat'l Conf. of the Electronic, Information & Telecom. Society of Japan, Paper No. SB-4-1, Sep. 1991, pp. 2-418-2-419.

"Adaptive Filters" edited by C. F. N. Cowan and P. M. Grant, 1985 by Prentice-Hall, Inc., Englewood Cliffs, N.J., pp. 30-31.

Primary Examiner—Stephen Chin
Assistant Examiner—Don Vo
Attorney, Agent, or Firm—Sughrue, Mion, Zinn, Macpeak & Seas

[57] ABSTRACT

A method and apparatus of estimating a data sequence transmitted using a Viterbi algorithm, are disclosed. Sampled values of incoming data are acquired at a predetermined time interval into a memory. Subsequently, a plurality of sampled values are retrieved from the memory. Further, a plurality of receive signal replicas, which have been previously prepared and stored in another memory, are retrieved. A plurality of receive signal replicas are determined by multiplying the sampled values by the receive signal replica coefficients. Branch metrics are then determined using the sampled values of the incoming data and the receive signal replicas. A data sequence is estimated using the branch metrics according to the Viterbi algorithm.

4 Claims, 9 Drawing Sheets

METHOD AND ARRANGEMENT OF ESTIMATING DATA SEQUENCES TRANSMITTED USING VITERBI ALGORITHM

BACKGROUND OF THE INVENTION

1. Field of the Invention

The present invention relates generally to a method and arrangement for correctly estimating or equalizing data sequences and more specifically to a method and arrangement which is capable of following rapid changes in channel characteristics with a very small number of data processing steps. The present invention is well suited for use in mobile communications system merely by way of example.

2. Description of the Prior Art

It is known in the art of a radio communications system that a receiver using maximum-likelihood sequence estimation exhibits extremely low error rate, particularly in the case of intersymbol interference. This maximum-likelihood sequence estimation technique is disclosed in an article entitled "Maximum-Likelihood Sequence Estimation of Digital Sequences in the Presence of Intersymbol Interference" by G. D. Forney J, IEEE Transactions on Information Theory Vol. IT-18, No 3, May 1972 (prior art paper 1).

In order to meet the situation wherein channel impulse responses vary with respect to time, an adaptive maximum-likelihood receiver has been proposed and disclosed in an article entitled "Adaptive Maximum-Likelihood Receive for Carrier-Modulated Data-Transmission Systems" by Gottfried Ungerboeck, IEEE Transactions on Communications Vol. Com-22, No. 5. May 5, 1974 (prior art paper 2). This type of arrangement or method utilizes a known training sequence, which is previously sent to a receiver in order to enable initial estimation of channel response of later data transmission. Following this, a decision sequence is generated from a sequence estimator with a predetermined delay using an adaptive algorithm.

However, this arrangement suffers from the drawback that the above mentioned algorithm is unable to follow very rapid changes in channel characteristics.

In order to overcome this drawback, a blind Viterbi equalizer was proposed in Japanese patent application No. 3-128494 and corresponding U.S. Pat. No. 5,325,402 (prior art paper 3). Both of the above mentioned applications have been assigned to the same entity as the present invention.

The known arrangement disclosed in the prior art paper 3, assumes that the transmit signal sequences and the characteristics of a channel are both unknown and then estimates a channel impulse response of each of all the signal sequences expected to be transmitted. Then, branch metrics are calculated using the estimated channel impulse responses to which Viterbi algorithm are applied. The channel impulse responses are estimated by solving a channel equation which is specified by three items: (1) candidates of transmitting signal sequences, (2) channel responses and (3) receive signals. This implies that the optimal solution of a channel impulse response is independently obtained at each time point and thus, the arrangement is able to follow very rapid changes in channel characteristics.

However, the blind Viterbi estimator or equalizer should process a large number of states and, accordingly suffers from the problem in that a hardware arrangement is undesirably rendered complicate.

Therefore, there have been proposed several sequence estimators each of which is able to follow rapid changes in channel characteristics using a smaller number of symbol states through the use of past information of survived signal sequences. Such sequence estimators are disclosed in the following articles entitled:

(a) "An adaptive Maximum-Likelihood Sequence Estimator for Fast Time-Varying Fading Channels" by Hiroshi KUBO, et. al., the 1990 Autumn National Assembly of the Electronic, Information & Telecommunication Society of Japan, paper No. B-283, October 1990 (prior art paper 4);

(b) "Joint Data and Channel Estimation using Fast Blind Trellis Search Techniques", IEEE Blobecom '90 Conference Record, pp. 1659–1963, December 1990 (prior art paper 5);

(c) "Reduced-State Blind Viterbi Equalizers" by Akihisa USHIROKAWA, the 1991 Autumn National Conference of the Electronic, Information & Telecommunication Society of Japan, paper No. SB-4-2, September 1991 (prior art paper 6); and (d) "Adaptive RLS-MLSE for Digital Mobile Radio" by Kazuhiko FUKAWA, et. al., the 1991 Autumn National Conference of the Electronic, Information & Telecommunication Society of Japan, paper No. SB-4-1, September 1991 (prior art paper 7)

Each of the known sequence estimators disclosed in the prior art papers 4–7, estimates a channel impulse response of each state of trellis diagram. Subsequently, the estimated impulse responses are processed using Viterbi algorithm. However, each of the known estimators of the prior art papers 4–7 is required to calculate the channel impulse responses of all the states of a trellis diagram and then implements branch metric calculation. Thus, the prior art techniques of the prior art papers 4–7, has encountered the problem that a large number of process steps is required.

SUMMARY OF THE INVENTION

An object of the present invention is to provide a method/arrangement which is capable of following rapid changes in channel characteristics with a very small number of data processing steps.

Another object of the present invention is to provide a method/arrangement wherein there is no need to calculate any channel impulse responses for determining receive signal replicas and which features a very small number of data processing steps.

In brief, the above object is achieved by an arrangement/method wherein a method and apparatus of estimating a data sequence transmitted using a Viterbi algorithm, are disclosed. Sampled values of incoming data are acquired at a predetermined time interval into a memory. Subsequently, a plurality of sampled values are retrieved from said memory. Further, a plurality of receive signal replicas, which have been previously prepared and stored in another memory, are retrieved. A plurality of receive signal replicas are determined by multiplying the sampled values by the receive signal replica coefficients. Branch metrics are then determined using the sampled values of the incoming data and the receive signal replicas. A data sequence is estimated using said branch metrics according to the Viterbi algorithm.

A first aspect of the present invention comes in a method of a method of estimating a data sequence transmitted using a Viterbi algorithm, comprising the steps of: (a) storing sampled values of incoming data at a predetermined time interval in a first memory; (b) retrieving a plurality of sampled values from said memory; (c) retrieving a plurality of receive signal replicas previously prepared and stored in a second memory; (d) determining a plurality of receive signal replicas by multiplying said plurality of sampled values retrieved in step (b) by said plurality of receive signal replica coefficients retrieved in step (c); (d) determining branch metrics using said sampled values of the incoming data and said receive signal replicas; and (e) estimating a data sequence using said branch metrics according to the Viterbi algorithm.

A second aspect of the present invention comes in an apparatus for estimating a data sequence transmitted using a Viterbi algorithm, comprising: a first memory for storing sampled values of incoming data at a predetermined time interval; a second memory for storing a plurality of receive signal replica coefficients which are used to determine receive signal replicas of all transitions branched from each state of a trellis diagram at a given time point, said receive signal replica coefficient being previously prepared; a first controller (38) which receives, a plurality of sampled values from said first memory and a plurality of receive signal replica coefficients from said second memory, in connection with a plurality of first set of states of a trellis diagram, said first controller producing a plurality of first pairs each consisting of a sampled value and a corresponding receive signal replica coefficient; a second controller which searches for, using history of survivor paths defined by a Viterbi algorithm, a plurality of sampled values from said first memory and a plurality of receive signal replica coefficients from said second memory both in connection with a plurality of second set of states of said trellis diagram, said second controller producing a plurality of second pairs each consisting of a sampled value and a corresponding receive signal replica coefficient; a receive signal replica generator which receives said first and second pairs and determines receive signal replicas in connection with all of said transitions; a branch metric calculator which is coupled to receive said receive signal replicas and said sampled values at said given time point and then determines branch metrics; and a Viterbi processor (36) which is coupled to receive said branch metric and estimates a data sequence, said Viterbi processor outputting said history of survivor paths.

A third aspect of the present invention comes in a Viterbi estimator for estimating a data sequence transmitted using a trellis diagram including reduced states, comprising: a first memory for storing sampled values of incoming data at a predetermined time interval; a second memory for storing a plurality of receive signal replica coefficients which are used to determine receive signal replicas resulting from all transitions branched from trellis diagram's reduced states at a given time point, said receive signal replica coefficients being previously prepared; a replica calculation controller (58) which, in the event that a reduced state is detected as a non-singular state using history of survivor paths defined by a Viterbi algorithm, searches for a plurality of sampled values and a plurality of receive signal replica coefficients both related to the reduced state detected as a non-singular state, said replica calculation controller, in the event that a reduced state is detected as a singular state using the history of survivor paths, detecting a latest non-singular state on each of said survivor paths and then searching for a plurality of sampled values and a plurality of receive signal replica coefficients both related to the latest non-singular state detected, said replica calculation controller generating the sampled values and the receive signal replica coefficients which have been searched; a receive signal replica generator which receives said sampled values and said receive signal replica coefficients which are generated from said replica calculation controller, said receive signal replica generator determining receive signal replicas in connection with all of transitions of said reduced state trellis diagram; a branch metric calculator (54) which is coupled to receive said receive signal replicas and said sampled values and then determines branch metrics of said reduced state trellis diagram; and a Viterbi processor which is coupled to receive said branch metric and estimates a data sequence, said Viterbi processor outputting said history of survivor paths.

BRIEF DESCRIPTION OF THE DRAWINGS

The features and advantages of the present invention will become more clearly appreciated from the following description taken in conjunction with the accompanying drawings in which like elements are denoted by like reference numerals and in which.

DETAILED DESCRIPTION OF THE PREFERRED EMBODIMENTS

Figure 1:
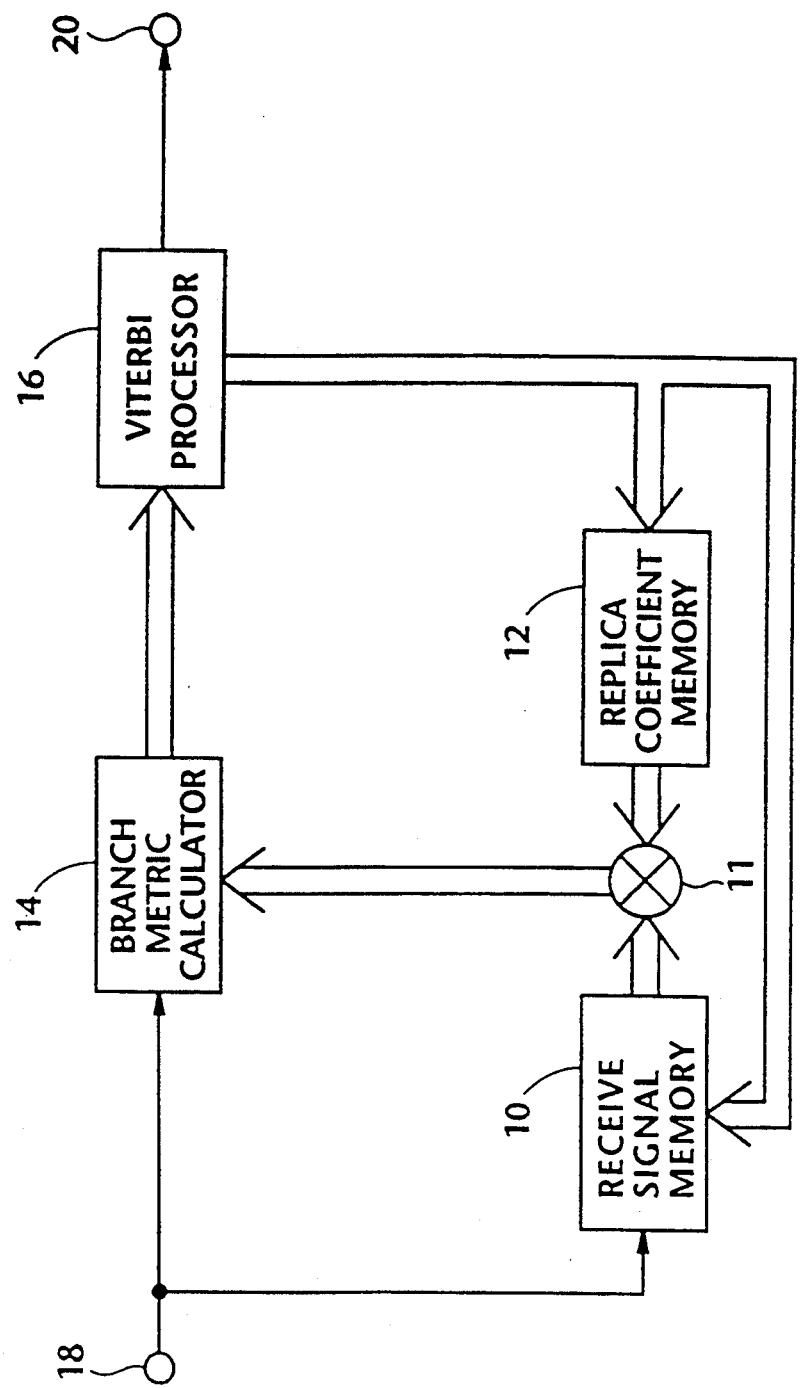
FIG. 1 is a block diagram showing the conceptual arrangement of the first embodiment of the present invention.

Before turning to the present invention, it is deemed advantageous to consider the channel impulse response estimation of the blind Viterbi equalizer disclosed in the prior art paper 3.

After the discussion, the feature which characterizes the present invention will be described. According to the present invention, receive signal replicas (viz., virtual signal points) can effectively be calculated without the calculation of channel impulse responses. Thus, the blind Viterbi estimator or equalizer of the present invention is able to markedly reduce the number of processing steps for estimating data sequences transmitted.

A channel impulse response $\vec{h}_k{}^t$ at time point kT can be expressed in vector form as shown below.

$$\vec{h}_k{}^t = (h_k{}^0, h_k{}^1, \ldots h_k{}^L) \tag{1}$$

where a superscript t denotes transposition of a vector or matrix, and L denotes the number of Intersymbol Interference (ISI) components. A transmit signal sequence is represented by $$\vec{s}_k{}^t = (s_k, s_{k-1}, \ldots, s_{k-L}) \tag{2}$$

Designating $v_k$ as an additive noise independent of transmitted data, a receive signal $r_k$ at time point kT is given by $$r_k = \vec{s}_k{}^t * \vec{h}_k + v_k \tag{3}$$

where * denotes convolution. Throughout the remainder of the instant specification, equation 2 is referred to as a channel equation.

When collecting N channel impulse response equations between time points (k−N+1) and kT, a channel equation over N time points can be expressed by $$\vec{r}_k = S_k{}^t * \vec{h}_k + v_k \tag{4}$$

where $$r_k{}^t = (r_k, r_{k-1}, \ldots, r_{k-N+1}) \tag{5}$$

$$S_k{}^t = \begin{bmatrix} s_k & s_{k-1} & \cdots & s_{k-L} \\ s_{k-1} & s_{k-2} & \cdots & s_{k-L-1} \\ & & \cdots & \\ s_{k-N-1} & s_{k-N} & \cdots & s_{k-L-N+1} \end{bmatrix} \tag{6}$$

and $$\vec{v}_k{}^t \approx (v_k, v_{k-1}, \ldots, v_{k-N+1}) \tag{7}$$

Implementing least square estimation on equation 4, a channel impulse response vector $(\hat{h}_{t,ls})$ is given by $$\hat{h}_{t,ls} = (S_k{}^t \cdot S_k)^{-1} \cdot S_k{}^t \vec{r}_k \tag{8}$$

For further information for obtaining the above mentioned least square estimation, reference should be made to a book entitled "Adaptive Filters" edited by C. F. N. Cowan and P. M. Grant, 1985 by Prentice-Hall, Inc., Englewood Cliffs, N.J. 07632 (prior art paper 8).

In particular, in the event that the number of the receive signals (viz., N) for use in estimation of impulse responses, is equal to the number of the components of channel impulse responses (L+1), then the transmission signal matrix $S_k$ can be deemed a square matrix. Accordingly, an estimated value of a channel impulse response using the least square estimation, can be obtained merely by multiplying a receive signal by the inverse of the transmission matrix $S_k$. That is, $$\hat{h}_{t,ls} = S_k{}^{-1} \vec{r}_k \tag{9}$$

The blind Viterbi equalizer of the prior art paper 3, is arranged to obtain the channel impulse responses $(\hat{h}_{t,ls})$ of all the combinations of possible transmitted signals (viz., $(s_{k-L-N+1}, \ldots, s_{k-1}, s_k)$). Each of the channel impulse responses thus obtained is used for determination of the branch metric at the next time point. (viz., (k+1)T). In more specific terms, a receive signal replica (viz., virtual receive signal point) at time point (k+1)K, which is denoted by $\hat{r}_{k+1}$, is given by $$\hat{r}_{k+l} = S_{k+l}{}^t \vec{h}_{k,ls} \tag{10}$$

Designating a transition from a given state $(s_{k-L-N+1}, \ldots, s_k)$ to the next state $(s_{k-L-N+2}, \ldots, s_{k+1})$ as $(s_{k-L-N+1}, \ldots, s_k : s_{k+1})$, the branch metric of the transition is given by $$Mk(s_{k-L-N+1}, \ldots, s_k : s_{k+1}) = |r_{k+1} - \hat{r}_{k+1}|^2 \tag{11}$$

The Viterbi algorithm is used to determine a transmit signal sequence (viz., data sequence) which renders minimal the sum of the above mentioned branch metrics over all the times.

The states of a trellis diagram for use in the Viterbi algorithm are determined by (L+N) combinations the states $(s_{k-L-N+1}, \ldots, s_k)$ of the transmit signals. Throughout the remainder of this specification, in the event that the transmit signal matrix $S_k$ (in the case of N=L+1) or $S_k{}^t \cdot S_k$ (in the case of N>L+1) both determined by the states $(s_{k-L-N+1}, \ldots, s_k)$ is not provided with the corresponding inverse matrix, then this state is called a "singular" state. Conversely, if the above mentioned matrix $S_k$ or $S_k{}^t \cdot S_k$ has the corresponding inverse matrix, the state is called a "non-singular" state.

The Viterbi equalizer disclosed in the prior art paper 6, specifies the states of a trellis diagram using the L combinations of the states $(s_{k-L+1}, \ldots, s_k)$. Further, the prior art paper 6 proposes a reduced-state blind Viterbi equalizer wherein the remaining transmit signals $(s_{k-L-N+1}, \ldots, s_{k-L})$ included in the components of the transmit signal matrix $S_k$ in equation 9, are compensated for using history of each of the survived sequences.

According to the reduced state blind Viterbi algorithm, the reduced states at time point kT and the history of the survivor paths thereof are utilized to reconstruct the corresponding non-reduced (viz., basic) state $(s_{k-L-N+1}, \ldots, s_k)$. If the transmit matrix $S_k$ (N=L+1) or $S_k{}^t \cdot S_k$ (N>L+1) has no inverse matrix, the reduced state is called a "singular" reduced state. Conversely, if the reduced state in question has the inverse matrix, it is called a "non-singular" reduced state. Thus, the inverse matrix of $S_k$ or $S_k{}^t \cdot S_k$ becomes uncertain in the case of the singular state. In this instance, the prior art algorithm disclosed in paper 6 goes back to the past time points along with a survive path and detects the latest past time point at which the matrix $S_{k-m}$ or $S_{k-m}{}^t \cdot S_{k-m}$ (m>1) becomes a non-singular state. Following this, a channel impulse response at this time point is solved and utilized as a replacement value of the singular reduced state.

Summing up, the arrangement/method of the prior art paper 6 determines the receive signal replica by $$\vec{s}_{k+1}{}^t \cdot S_{k-m}{}^{-1} \cdot \vec{r}_{k-m} \tag{12}$$

in place of $$\vec{h}_{k,ls} \tag{13}$$

Accordingly, the prior art disclosed in the paper 6 suffers from the following difficulties. That is, if signal sequences having consecutive singular states are transmitted, the channel path estimation is undesirably delayed and thus it is no longer expected to follow rapid changes in channel characteristics.

The concept underlying the present invention will briefly be discussed.

Substituting equation 9 into equation 10 represents:

$$\hat{r}_{k+1} = s^t_{k+1} \cdot \vec{s}_k^{-1} \cdot \vec{r}_k \qquad (14)$$
$$= \vec{c}^t_{k+1} \cdot \vec{r}_k$$

It is understood that the vector $c_{k+1}$ (viz., $s_{k+1}{}^t \cdot S_k{}^{-1}$) in equation 14 can be determined by (L+N+1) combinations of sates ($s_{k-L-N+1}, \ldots, s_{k+1}$) and that the vector $c_{k+1}$ is independent of any receive signal. Therefore, if the (L+N+1) combinations (viz., states) ($s_{k-L-N+1}, \ldots, s_{k+1}$) of all the possible transmit signals are previously determined and stored in a suitable memory, then the receive signal replicas can be obtained by referring to the stored values of the combinations. That is, the calculation of the channel impulse responses is no longer required to obtain the receive signal replicas. In other words, the steps for estimating channel impulse responses can effectively be omitted. The same discussion can be applied to the case where equation 8 is used in lieu of equation 9.

Seven preferred embodiments of the present invention will be discussed with reference to FIGS. 1 to 9.

Merely for the sake of simplifying the discussion, the estimation of channel impulse responses of each of the seven embodiments of the present invention, is implemented in connection with a particular case where L=1 (viz., two-wave channel model) and N=2 (viz., receive signals at two time points). Further, it is assumed that each of the transmit signals takes the form of a binary signal whose levels are denoted by {0,1}. Thus, the non-reduced state trellis diagram takes 8 states in total in this instance. It is still further assumed that a reduced state trellis diagram takes 2 states although it is also able to take 4 states.

Figure 2:
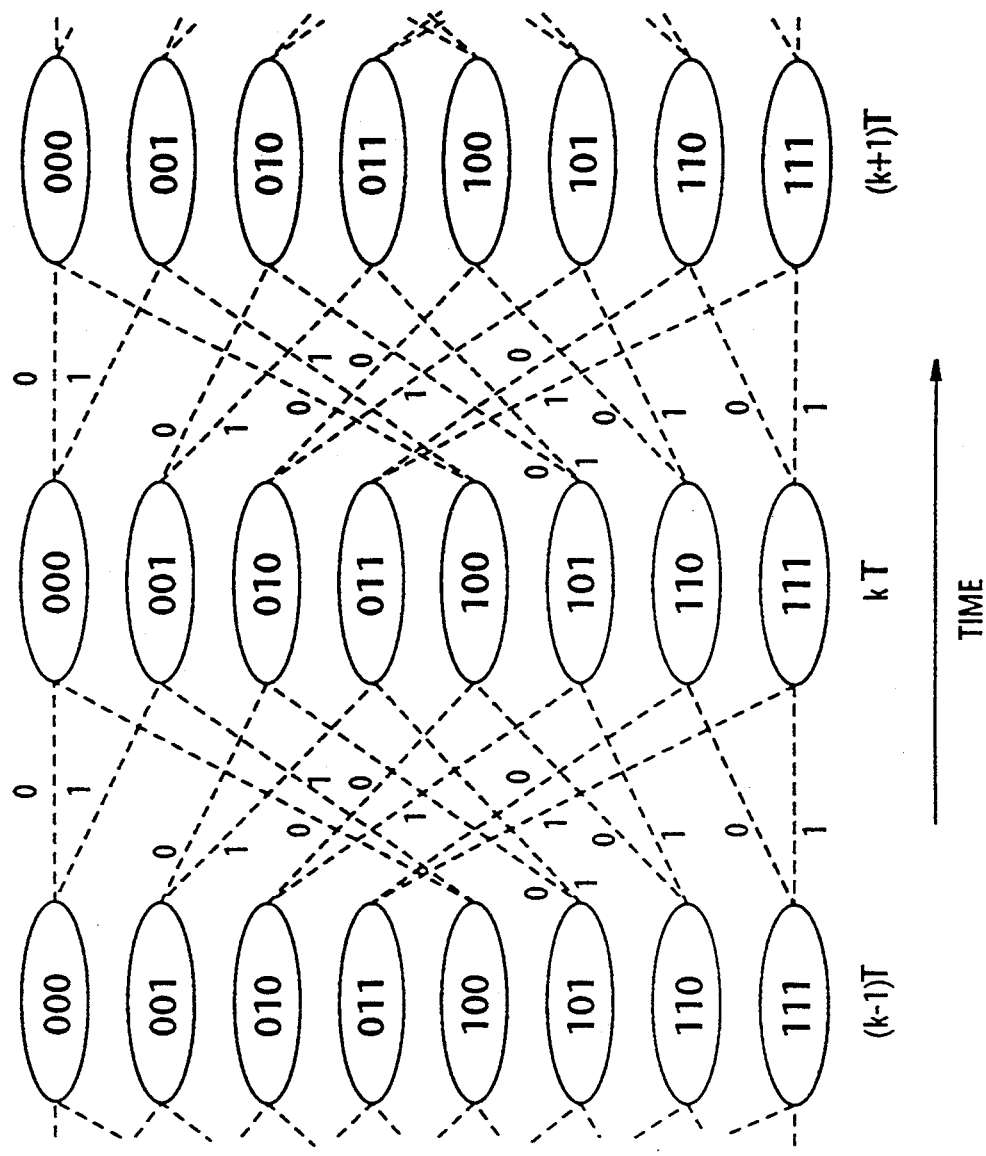
FIG. 2 is a trellis diagram which depicts the operation of the first embodiment of the invention.

FIG. 1 is a schematic block diagram showing a conceptual arrangement of a first embodiment of the present invention, while FIG. 2 is a trellis diagram at three time points (k−1)T, kT and (k+1)T for discussing the operation of the first embodiment.

As shown, the FIG. 1 arrangement includes a receive signal memory 10, a multiplier 11, a receive signal replica coefficient memory 12, a branch metric calculator 14 and a Viterbi processor 16, all of which are coupled as shown. The FIG. 1 arrangement further includes an input terminal 18 to which sampled values of the incoming signal $r_k$ (equation 3) is applied, and an output terminal 20 from which estimated data sequences are derived.

As shown in FIG. 2, the number of the states generally defined by ($s_{k-2}, s_{k-1}, s_k$) at the time point kT are eight in total and represented as (000), (001), (010), (011), (100), (101), (110) and (111). The number of the transitions from the state ($s_{k-2}, s_{k-1}, s_k$) to the next time point state ($s_{k-1}, s_k, s_{k+1}$), which is denoted by ($s_{k-2}, s_{k-1}, s_k: s_{k+1}$), is 16 in this particular case. For example, the signal sequence (1,1,0) at time point kT, may assume two different transitions depending on the logic levels 0 or 1 which the transition signal (or symbol) $s_{k+1}$ may assume. That is, if the transition signal $s_{k+1}$ assumes 0 then the signal sequence at the next time point (k+1)T is (1,0,0), while if the transition signal $s_{k+1}$ assumes 1 then the signal sequence at the next time point (k+1)T is (1,0,1). These transitions are respectively denoted by (1,1,0:0) and (1,1,0:1).

Before bringing the FIG. 1 arrangement into operation replica coefficient vectors $\vec{c}_{k+1}{}^t(=s_{k+1}{}^t \cdot s_k{}^{-1})$ are calculated and stored in the replica coefficient memory 12. In more specific terms, the replica coefficient vectors $\vec{c}_{k+1}$ is 16 in total and are represented as:

$\vec{c}_{k+1}(0,0,0:0), \vec{c}_{k+1}(0,0,0:1)$
$\vec{c}_{k+1}(0,0,1:0), \vec{c}_{k+1}(0,0,1:1)$
$\vec{c}_{k+1}(0,1,0:0), \vec{c}_{k+1}(0,1,0:1)$
$\vec{c}_{k+1}(0,1,1:0), \vec{c}_{k+1}(0,1,1:1)$
$\vec{c}_{k+1}(1,0,0:0), \vec{c}_{k+1}(1,0,0:1)$
$\vec{c}_{k+1}(1,0,1:0), \vec{c}_{k+1}(1,0,1:1)$
$\vec{c}_{k+1}(1,1,0:0), \vec{c}_{k+1}(1,1,0:1)$
$\vec{c}_{k+1}(1,1,1:0), \vec{c}_{k+1}(1,1,1:1)$ As mentioned above, these 16 receive signal replica coefficients are previously determined and then stored in the memory 12.

The sampled values of the incoming data, applied to the input terminal 18 at time point (k−1)T, are successively stored in the receive signal memory 10 and directly applied to the branch metric calculator 14. At time point kT, the receive signal vector $\vec{r}_k$ stored in the memory 10 are read out therefrom and applied to the multiplier 11. Simultaneously, the replica coefficient vectors $\vec{c}_{k+1}$ are retrieved from the memory 12 and then applied to the multiplier 11. The multiplier 11 determines the receive signal replicas $\hat{r}_{k+1}$ (the number of which is 16) by carrying out $\vec{c}_{k+1}{}^t \cdot \vec{r}_k$ in connection with the 16 possible transitions from time point kT to (k+1)T. Subsequently, the branch metric calculator 14 determines the following branch metrics, using the 16 receive signal replicas and the receive signals at time point (k+1)T.

$$\begin{aligned}
Mk(0,0,0:0) &= |r_{k+1} - \vec{c}_{k+1}(0,0,0:0)^t \vec{r}_k|^2 \\
Mk(0,0,0:1) &= |r_{k+1} - \vec{c}_{k+1}(0,0,0:1)^t \vec{r}_k|^2 \\
Mk(0,0,1:0) &= |r_{k+1} - \vec{c}_{k+1}(0,0,1:0)^t \vec{r}_k|^2 \\
Mk(0,0,1:1) &= |r_{k+1} - \vec{c}_{k+1}(0,0,1:1)^t \vec{r}_k|^2 \\
Mk(0,1,0:0) &= |r_{k+1} - \vec{c}_{k+1}(0,1,0:0)^t \vec{r}_k|^2 \\
Mk(0,1,0:1) &= |r_{k+1} - \vec{c}_{k+1}(0,1,0:1)^t \vec{r}_k|^2 \\
Mk(0,1,1:0) &= |r_{k+1} - \vec{c}_{k+1}(0,1,1:0)^t \vec{r}_k|^2 \\
Mk(0,1,1:1) &= |r_{k+1} - \vec{c}_{k+1}(0,1,1:1)^t \vec{r}_k|^2 \\
Mk(1,0,0:0) &= |r_{k+1} - \vec{c}_{k+1}(1,0,0:0)^t \vec{r}_k|^2 \\
Mk(1,0,0:1) &= |r_{k+1} - \vec{c}_{k+1}(1,0,0:1)^t \vec{r}_k|^2 \\
Mk(1,0,1:0) &= |r_{k+1} - \vec{c}_{k+1}(1,0,1:0)^t \vec{r}_k|^2 \\
Mk(1,0,1:1) &= |r_{k+1} - \vec{c}_{k+1}(1,0,1:1)^t \vec{r}_k|^2 \\
Mk(1,1,0:0) &= |r_{k+1} - \vec{c}_{k+1}(1,1,0:0)^t \vec{r}_k|^2 \\
Mk(1,1,0:1) &= |r_{k+1} - \vec{c}_{k+1}(1,1,0:1)^t \vec{r}_k|^2 \\
Mk(1,1,1:0) &= |r_{k+1} - \vec{c}_{k+1}(1,1,1:0)^t \vec{r}_k|^2 \\
Mk(1,1,1:1) &= |r_{k+1} - \vec{c}_{k+1}(1,1,1:1)^t \vec{r}_k|
\end{aligned} \qquad (15)$$

The Viterbi processor 16 is supplied with the 16 branch metrics (viz., $Mk(s_{s-2}, s_{k-1}, s_k:s_{k+1})$) and determines the path which exhibits the minimum path-metric. The output of the Viterbi processor 16 is derived from the output terminal 20.

The operations of the Viterbi processor 16 are identical to those disclosed in the above mentioned prior art papers 1 and 2 and, accordingly no further discussion will be referred to for brevity.

In the above discussion, the branch metrics have been specified using square errors as shown in equation 15. However, the present invention is by no means limited to such a method and may involve the cases: (a) by expanding equation 15 and then removing the common terms $r_{k+1}{}^2$ or (b) by further changing the sign of each result and then determining the maximum metric.

The first embodiment can be applied to the reduced state blind Viterbi equalization which is disclosed in the prior art paper 6, as will be discussed below.

Figure 3:
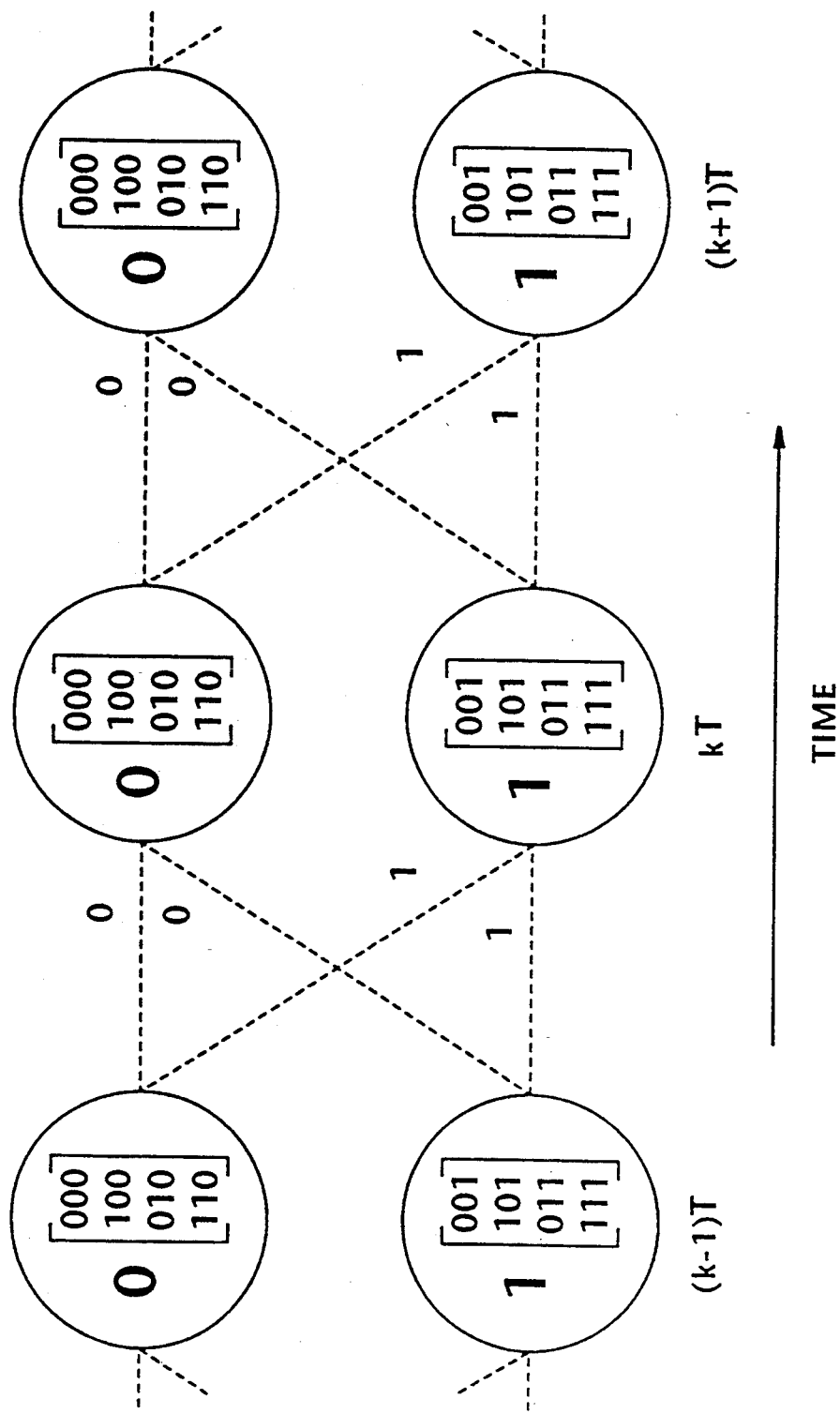
FIG. 3 is a trellis diagram which shows the second order reduced-states within a plurality of circles together with the corresponding original (or non-reduced) states and which is used to discuss a plurality of embodiments of the present invention.

FIG. 3 is a trellis diagram which shows "second order" reduced-states within a plurality of circles together with the corresponding non-reduced states which are in parentheses and which have been shown in FIG. 2. Each of the second order reduced-states is generated by deleting the two preceding transmit signals of the corresponding basic state group. That is, each of the basic states (0,0,0), (1,0,0), (0,1,0) and (1,1,0) is twice reduced to "0", while each of the basic states (0,0,1), (1,0,1), (0,1,1) and (1,1,1) is twice reduced to "1", wherein the comma "," between the transmit signals are omitted in FIG. 3 merely for the sake of simplifying the drawing.

In other words, the second order reduced-state "0" corresponds to any one of the four basic states (000), (100), (010) and (110). Similarly, the second order reduced-state "1" corresponds to any one of the basic states (001), (101), (011) and (111). To which basic state the reduced state "0" (or "1") corresponds, is specified by survivor paths which can he derived from the Viterbi processor 16. For example, if the survivor paths of the reduced-state "0" at time point kT indicates the reduced states "0", "1" at time points $(k-1)T$, $(k-2)T$ respectively, then the corresponding basic state of the reduced state "0" at time point kT is determined as (1,0,0). It is understood that if the second order reduced-state "1" corresponds to the basic state (1,1,1), the branch metric calculator 14 calculates only the four branch metrics, viz., Mk(1,0,0:0), Mk(1,0,0:1), Mk(1,1,1:0) and Mk(1,1,1:1).

With both the basic and reduced-state type Viterbi estimators, in the event that the corresponding basic state is a singular state, the survivor path information obtained by the Viterbi processor 16 is used to search for the latest non-singular state on the survivor path. Subsequently, the non-singular state $(s_{k-L-N+1-m}, \ldots, s_{k-m})$ $(m>1)$ is used to retrieve, from the memory 12, the corresponding replica coefficient vector $(\vec{c}_{k+1}{}^t = \vec{s}_{k-m}{}^{-t} \cdot S_{k-m}{}^{-1})$. Further, the transmit signal candidates $(s_{k+1}, s_k)$ at time point $(k+1)T$ are used to derive the corresponding receive signal $r_{k-m}$ from the other memory 10. Following this, the multiplier 11 multiplies the two vectors derived from the memories 10, 12, after which the calculator 14 calculates the branch metrics using the result of the multiplier 11.

Figure 4:
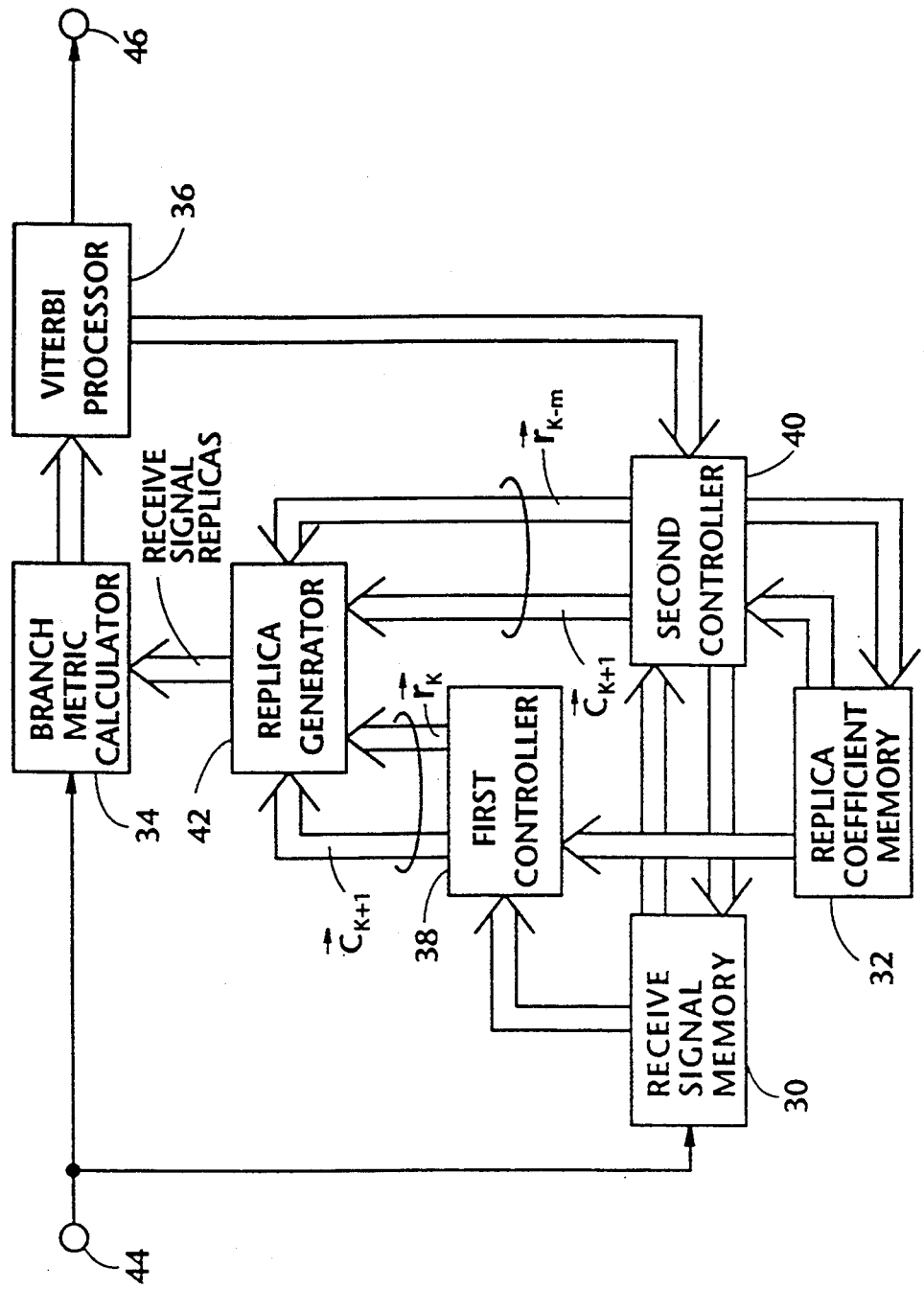
FIG. 4 is a block diagram showing the conceptual arrangement of a second embodiment of the present invention.

Reference is made to FIG. 4, wherein a second embodiment of the present invention is shown in block diagram.

The FIG. 4 arrangement includes, a receive signal memory 30, a replica coefficient memory 32, a branch metric calculator 34, a Viterbi processor 36, first and second controllers 38, 40, a receive signal replica generator 42, an input terminal 44, and an output terminal 46, as illustrated.

As in the case of the first embodiment, the 16 receive signal replica coefficients are previously determined and then stored in the memory 32.

Sampled values of incoming signals are successively stoked in the receive signal memory 30. The first controller 38 is supplied with the following replica coefficients $\vec{c}_{k+1}{}^t$ from the replica coefficient memory 32 in connection with all the transitions each of which has originated or started from a non-singular state.

$$\vec{c}_{k+1}{}^t = \vec{s}_{k+1}{}^t \cdot S_k{}^{-1}$$

Further, the first controller 38 is arranged to be supplied with the receive signal vector $\vec{r}_k$ from the memory 30 and then applies a plurality of pairs of $\vec{c}_{k+1}$ and $\vec{r}_k$ to the replica generator 42.

The second controller 40 is arranged to handle the transitions each of which has originated from a singular state. The second controller 40 is supplied, from the Viterbi processor 36, with the history of each of the survivor paths and then searches for the latest non-singular state $(s_{k-L-N+1}, \ldots, s_{k-m})$ $(m>1)$ on each of the survivor paths. It is assumed that the latest non-singular state is detected at time point $(k-m)T$. Subsequently, the second controller 40 searches for the two vectors set forth below using the above mentioned latest non-singular state and the transmit signal candidates $(s_{k+1}, s_k)$ at time point $(k+1)T$. The above mentions two vectors are:

(a) replica coefficient vectors $$\vec{c}_{k+1}{}^t = \vec{s}_{k+1} \cdot S_{k-m}{}^{-1}$$

derived from the replica coefficient memory 32, and (b) the receive signal vector $\vec{r}_{k-m}$ at the time point of the searched non-singular state from the receive signal memory 30.

Thus, the second controller 40 applies a plurality of pairs of $\vec{c}_{k+1}$ and $\vec{r}_{k-m}$ to the replica generator 42.

The replica generator 42 determines and generates a receive signal replica, in connection with each of the transition, by multiplying the receive signal by one of the replica coefficients applied from the first and second controllers 38, 40. The branch metric calculator 34, using the receive signal replicas from the generator 42, determines the 16 branch metrics shown in equation 15. Following this, the Viterbi processor 36 receives the branch metrics thus determined and specifies the path with a minimum path-metric. The output of the Viterbi processor 36 is derived from the output terminal 46.

Figure 5:
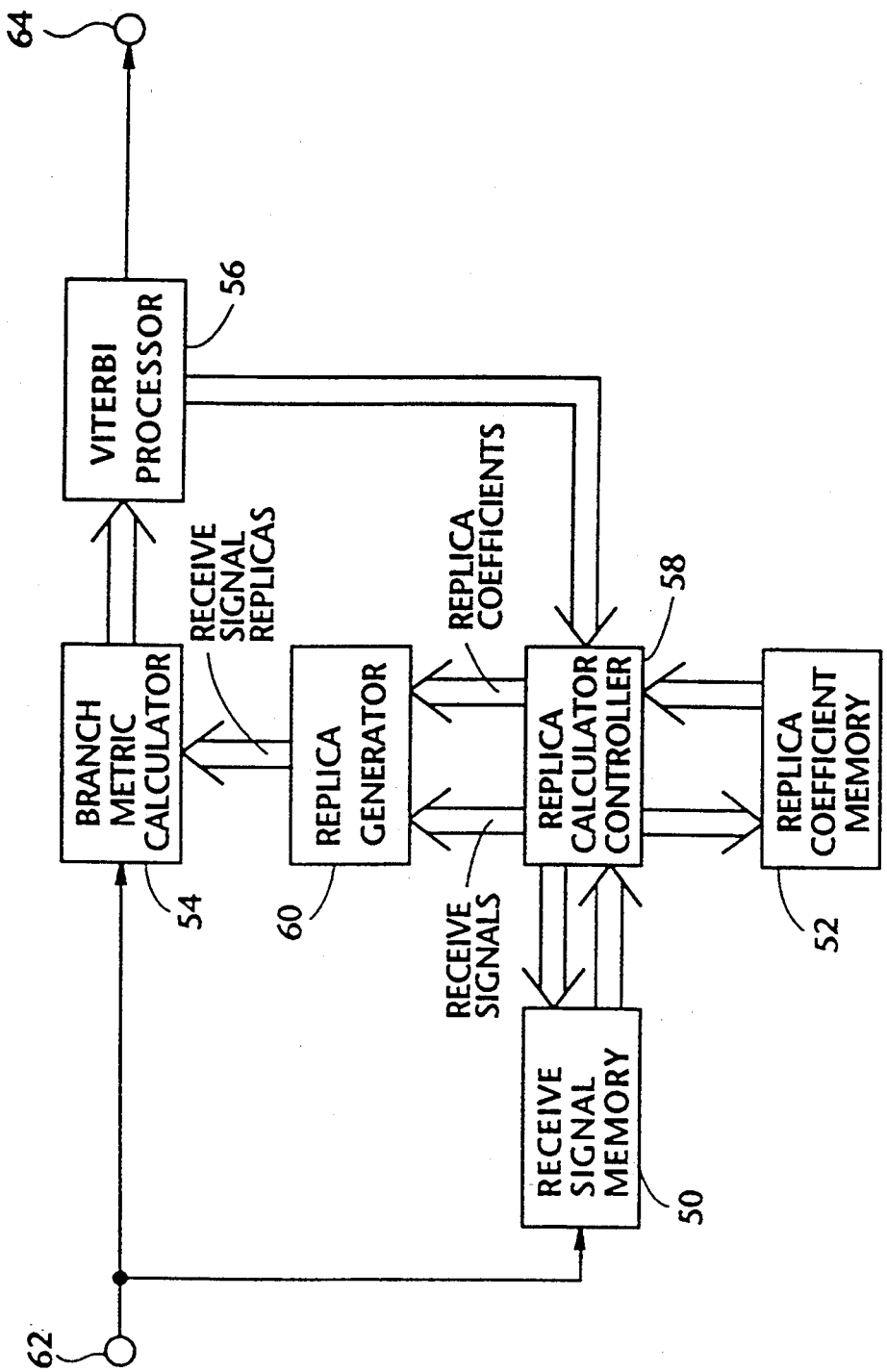
FIG. 5 is a block diagram showing the conceptual arrangement of a third embodiment whose purpose is essentially identical with that of the second embodiment of the invention.

Reference is made to FIG. 5, wherein a third embodiment of the present invention is shown in block diagram form.

The third embodiment is a reduced-state type Viterbi estimator which is modified from the second embodiment. For the convenience of description, the third embodiment will be discussed with the two order reduced-state as shown in FIG. 3.

The FIG. 5 arrangement includes, a receive signal memory 50, a replica coefficient memory 52, a branch metric calculator 54, a Viterbi processor 56, a replica calculation controller 58, a receive signal replica generator 60, an input terminal 62, and an output terminal 64, as shown.

As in the case of the first embodiment, the 16 receive signal replica coefficients are previously determined and then stored in the memory 52.

Sampled values of incoming signals are successively stored in the receive signal memory 50. The replica calculation controller 58 determines, at each of time points, the non-reduced (viz., original) states which corresponds to the reduced states (viz., 0 or 1) through the use of history of the survivor paths applied from the Viterbi processor 56.

Subsequently, in connection with all the transitions each of which has originated or started from a reduced non-singular state, the controller 58 receives the corresponding replica coefficients $\vec{c}_{k+1}{}^t = \vec{s}_{k+1}{}^t \cdot S_k{}^{-1}$ from the replica coefficient memory 52 and also receives the corresponding receive signal vector $\vec{r}_k$ from the memory 50.

On the other hand, in connection with all the transitions each of which has originated from a reduced singular state, the controller 58 searches for the latest non-singular state on the survived path using the survivor path information applied from the Viterbi processor 56. Subsequently, the non-singular state ($s_{k-L-N+1-m}$, ... $s_{k-m}$) (m > 1) detected is used to retrieve, from the memory 52, the corresponding replica coefficient vector ($\vec{c}_{k+1}{}^t = \vec{s}_{k+1}{}^t \cdot S_{k-m}{}^{-1}$). Further, the transmit signal candidates ($s_{k+1}$, $s_k$) at time point (k+1)T are used to derive the corresponding receive signal $r_{k-m}$ from the other memory 50. Following this, the replica generator 60 multiplies the two vectors derived from the memories 50, 52. The branch metric calculator 54 determines the branch metrics of the 4 transitions of the reduced-state trellis diagram. The Viterbi processor 56 receives the 4 branch metrics thus determined and specifies the path with a minimum path-metric. The output of the Viterbi processor 56 is derived from the output terminal 64.

Figure 6:
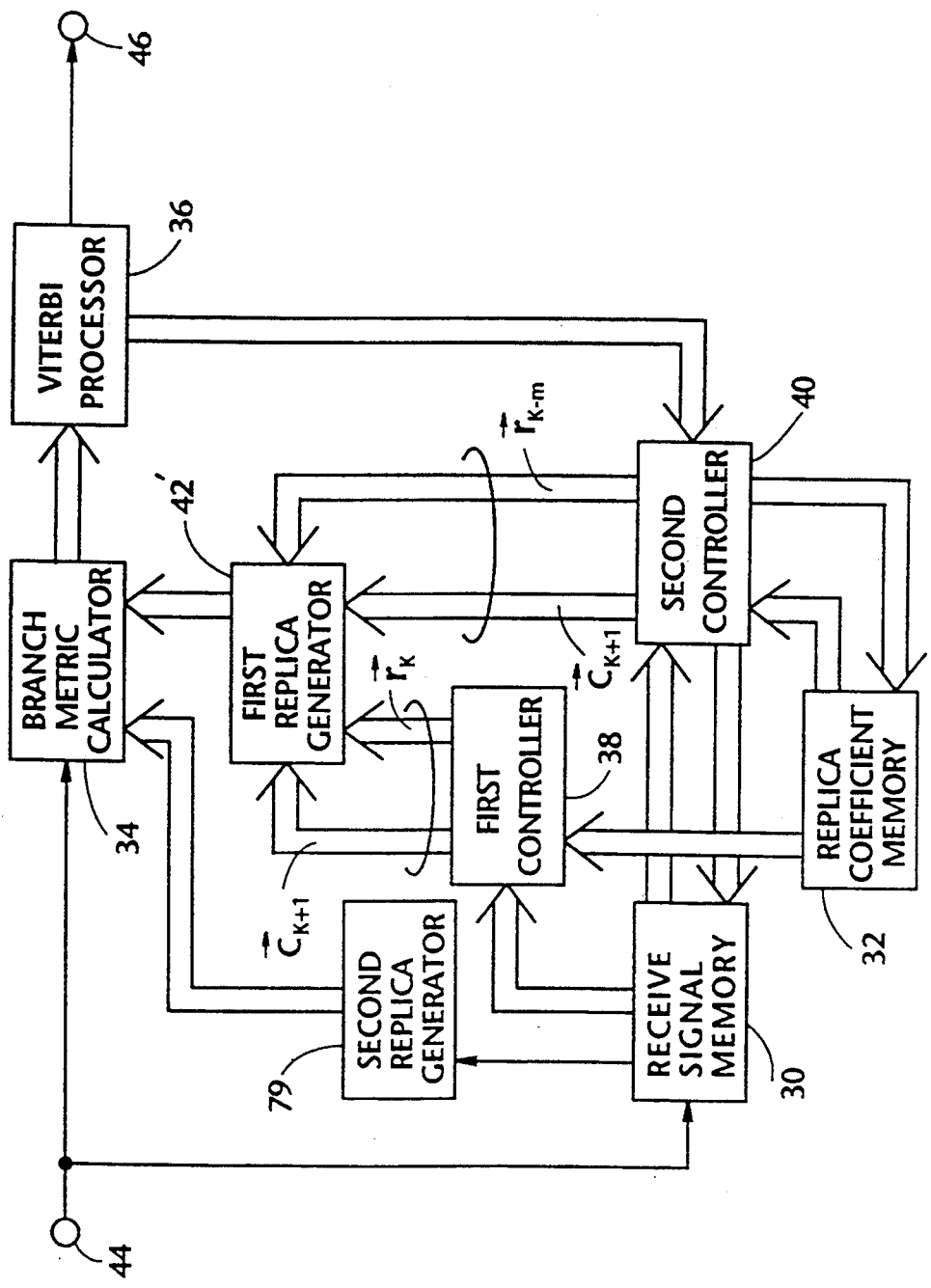
FIG. 6 is a block diagram showing the conceptual arrangement of a fourth embodiment of the present invention.

Reference is made to FIG. 6, wherein a fourth embodiment of the present invention is shown in block diagram.

The arrangement of FIG. 6 further includes a second replica generator 79 as compared with that of FIG. 4 and, other than this, the FIG. 6 arrangement is identical with the FIG. 4 arrangement. However, the replica generator 42 of FIG. 4 is denoted in FIG. 6 by reference numeral 42 plus a prime.

The fourth embodiment is characterized in processing of the following three transitions:

(a) transition which originates from a non-singular state;

(b) transition from a singular state to a non-singular state; and (c) transition between singular states.

The first replica generator 42' determines and generates a receive signal replica, in connection with the above mentioned two transition cases (a) and (b), by multiplying the receive signal by one of the replica coefficients applied from the first and second controllers 38, 40. These operations are identical with those of the second embodiment.

Before discussing the operation of the above mentioned transition case (c), a principle thereof will be described.

If a channel impulse response $h_{k+1}$ exists regarding a singular state ($s_{k-L-N+1}$, ..., $s_k$) at time point kT, the following equation is satisfied.

$$r_k = \vec{s}_k{}^t \cdot \vec{h}_{k,ls} \quad (16)$$

In the case where the transmit signals are phase-shift keyed (for example), if a state ($s_{k-L-N}$, ..., $s_{k+1}$) is singular then the transmit signal sequence vector $\vec{s}_k$ has a phase-shift relationship with $\vec{s}_{k+1}$. That is to say, $$\begin{aligned}\vec{s}_{k+1} &= \vec{s}_k \cdot (s_{k+1}/s_k) \\ &= \vec{s}_k \cdot \exp(j\theta)\end{aligned} \quad (17)$$

From equations 10, 16 and 17, we obtain $$\begin{aligned}\hat{r}_{k+1} &= \vec{s}_{k+1}{}^t \cdot \vec{h}_{k,ls} \\ &= r_k \cdot \exp(j\theta) \\ &= r_k \cdot (s_{k+1}/s_k)\end{aligned} \quad (18)$$

Accordingly, a receive signal replica $r_{k+1}$ of the transition between two singular states is equal to the receive signal $r_k$ (at the preceding time point) which is phase-shifted by $s_{k+1}/s_k$. This means that if the above mentioned method is utilized, the receive signal replica can be determined without delay even in the case where singular states successively occur. This is because the above operation is deemed equivalent to that wherein the replica is calculated using the latest channel impulse.

Returning to the aforesaid transition case (c) of the fourth embodiment, the second replica generator 79 receives the receive signal $r_k$ at time point kT from the memory 30 and then determines $r_k \cdot (s_{k+1}/s_k)$ which corresponds to the receive signal replica $r_{k+1}$ (see equation 18). The branch metric calculator 34 calculates the square value of the distance between the receive signal $r_{k+1}$ at time point (k+1)T and each of the replicas applied from the first and second replica generators 38, 79 and thus, generates 16 branch metrics. Finally, the Viterbi processor 36 receives the 16 branch metrics and specifies the path with a minimum path-metric. The output of the Viterbi processor 36 is derived from the output terminal 46.

Figure 7:
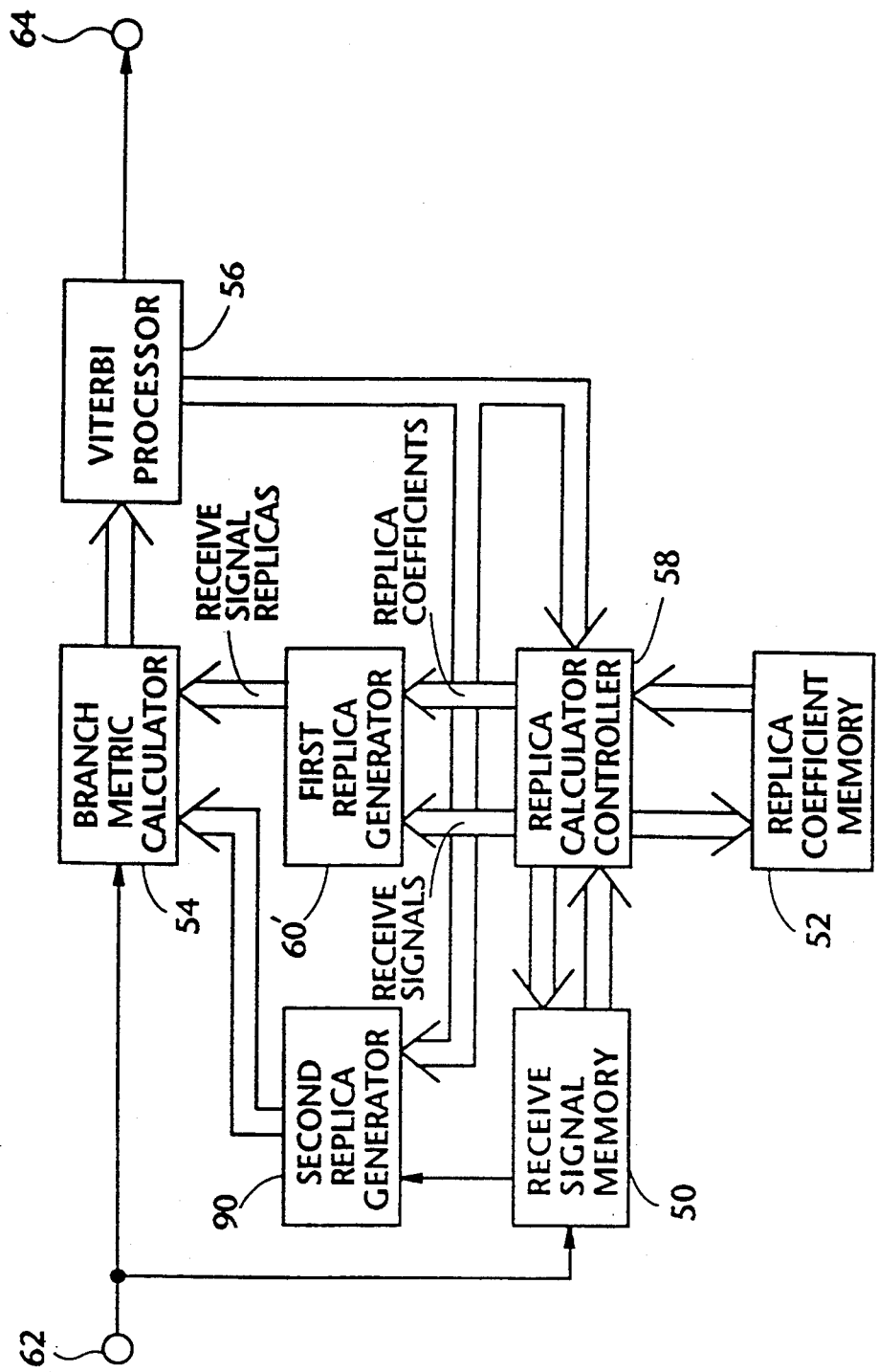
FIG. 7 is a block diagram showing the conceptual arrangement of a fifth embodiment whose purpose is essentially identical with that of the fourth embodiment of the invention.

Reference is made to FIG. 7, wherein a fifth embodiment of the present invention is shown in block diagram form.

The fifth embodiment is a reduced-state type Viterbi estimator which operates in a manner similar to the fourth embodiment and which take the form similar to the third embodiment of FIG. 5. For the convenience of description, the fifth embodiment will be discussed with the two order reduced-states as shown in FIG. 3.

The FIG. 7 arrangement, as compared with the FIG. 5 arrangement, further includes a second replica generator 90. Thus, the remaining blocks and terminals of FIG. 7 are denoted by the same numerals as those of FIG. 5. However, the block labelled the first replica generator in FIG. 7 is denoted by 60'.

As in the case of each of the preceding embodiments, the 16 receive signal replica coefficients are determined and then stored in the memory 52.

Sampled values of incoming signals are successively stored in the receive signal memory 50. The replica calculation controller 58 and the second replica generator 90 determines, at each of time points, to which non-reduced state the reduced states (viz., 0 or 1) correspond using the history of the survivor paths applied from the Viterbi processor 56.

Subsequently, in connection with all the transitions from singular states to non-singular states, the controller 58 receives the corresponding replica coefficients $\vec{c}_{k+1}{}^t = \vec{s}_{k+1}{}^t \cdot S_k{}^{-1}$ from the replica coefficient memory 52 and also receives the corresponding receive signal vector $\vec{r}_k$ from the memory 30.

On the other hand, in connection with all the transitions from singular states to non-singular states, the controller 58 searches for the latest non-singular states on the survived paths using the survivor path history applied from the Viterbi processor 56. Subsequently, the non-singular state ($s_{k-L-N+1-m}$, ..., $s_{k-m}$) (m > 1) detected is used to retrieve, from the memory 52, the corresponding replica coefficient vector ($\bar{c}_{k+1}{}^t = \bar{s}_{k+1}{}^t \cdot S_{k-m}{}^{-1}$). Further, the transmit signal candidates ($s_{k+1}$, $s_k$) at time point (k+1)T are used to derive the corresponding receive signal $r_{k-m}$ from the other memory 50.

The first replica generator 60' determines and generates a receive signal replica, in connection with the two transition cases (a) and (b) as mentioned in the fourth embodiment, by multiplying the receive signal by the replica coefficients applied from the controller 58.

The second replica generator 79 is supplied with the receive signal $r_k$ at time point kT from the memory 50 and then determines $r_k \cdot (s_{k+1}/s_k)$ which corresponds to the receive signal replica $\hat{r}_{k+1}$ (see equation 18). The branch metric calculator 54 calculates the square value of the distance between the receive signal $r_{k+1}$ at time point (k+1)T and each of the replicas applied from the first and second replica generators 38, 79 and thus, the branch metric calculator 54 determines the branch metrics of the 4 transitions of the reduced-state trellis diagram. The Viterbi processor 56 receives the 4 branch metrics thus determined and specifies the path with a minimum pathmetric. The output of the Viterbi processor 56 is derived from the output terminal 64.

Figure 8:
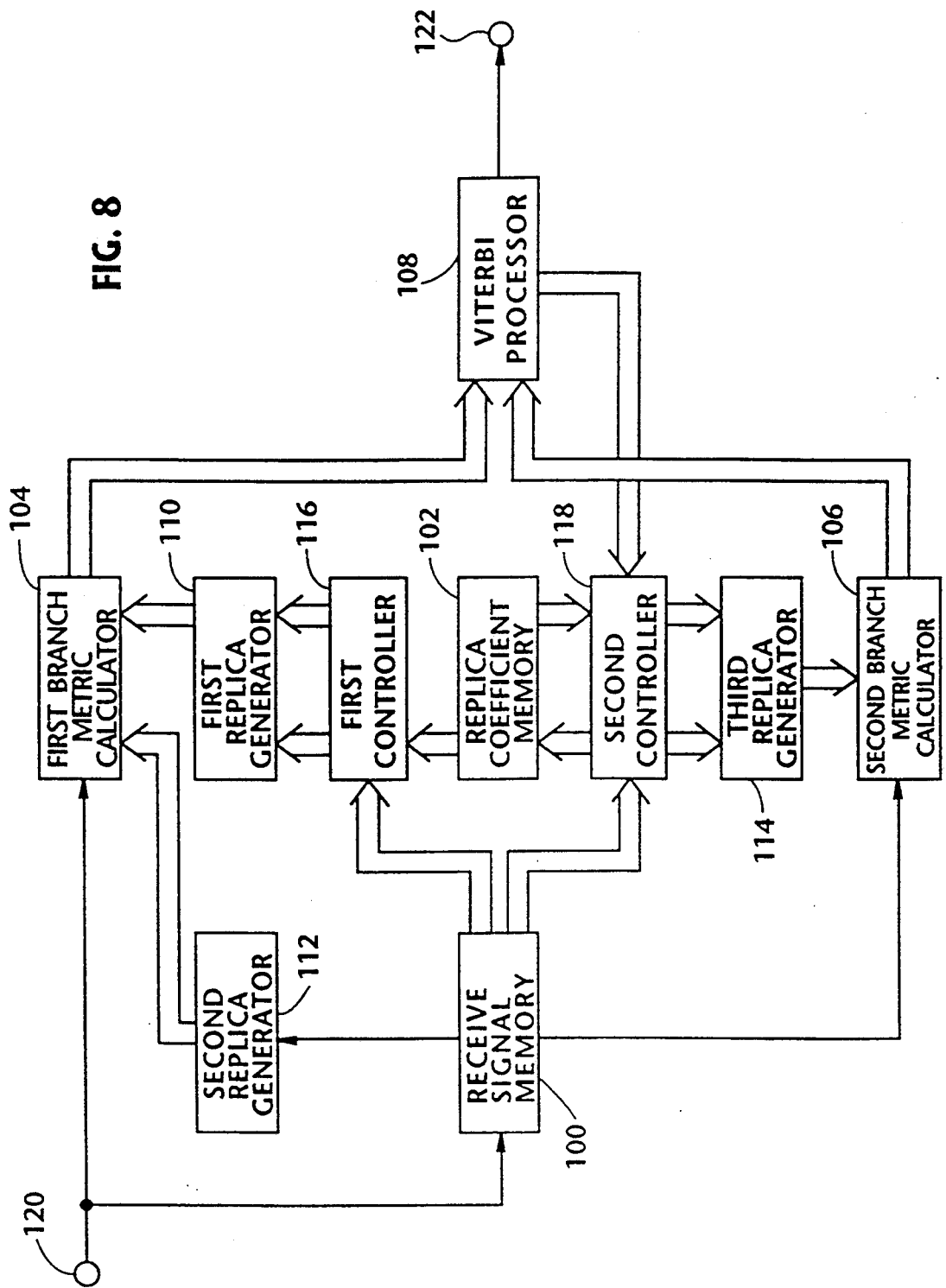
FIG. 8 is a block diagram showing the conceptual arrangement of a sixth embodiment of the present invention.

A sixth embodiment is shown in block diagram form in FIG. 8.

The sixth embodiment is characterized in processing of the following three transitions as in the fourth embodiment:

(a) transition which originates from a non-singular state;

(b) transition from a singular state to a non-singular state; and (c) transition between singular states.

However, the sixth embodiment deals with the above mentioned case (b) in a different manner as compared with the fourth embodiment.

The FIG. 8 arrangement includes, a receive signal memory 100, a replica coefficient memory 102, first and second metric calculators 104, 106, a Viterbi processor 108, first to third replica generators 110, 112 and 114, first and second controller 116, 118, an input terminal 120, and an output terminal 122, all of which are coupled as illustrated.

The operation of the FIG. 8 arrangement will be understood from the foregoing detailed description and hence will be omitted for the sake of brevity.

Figure 9:
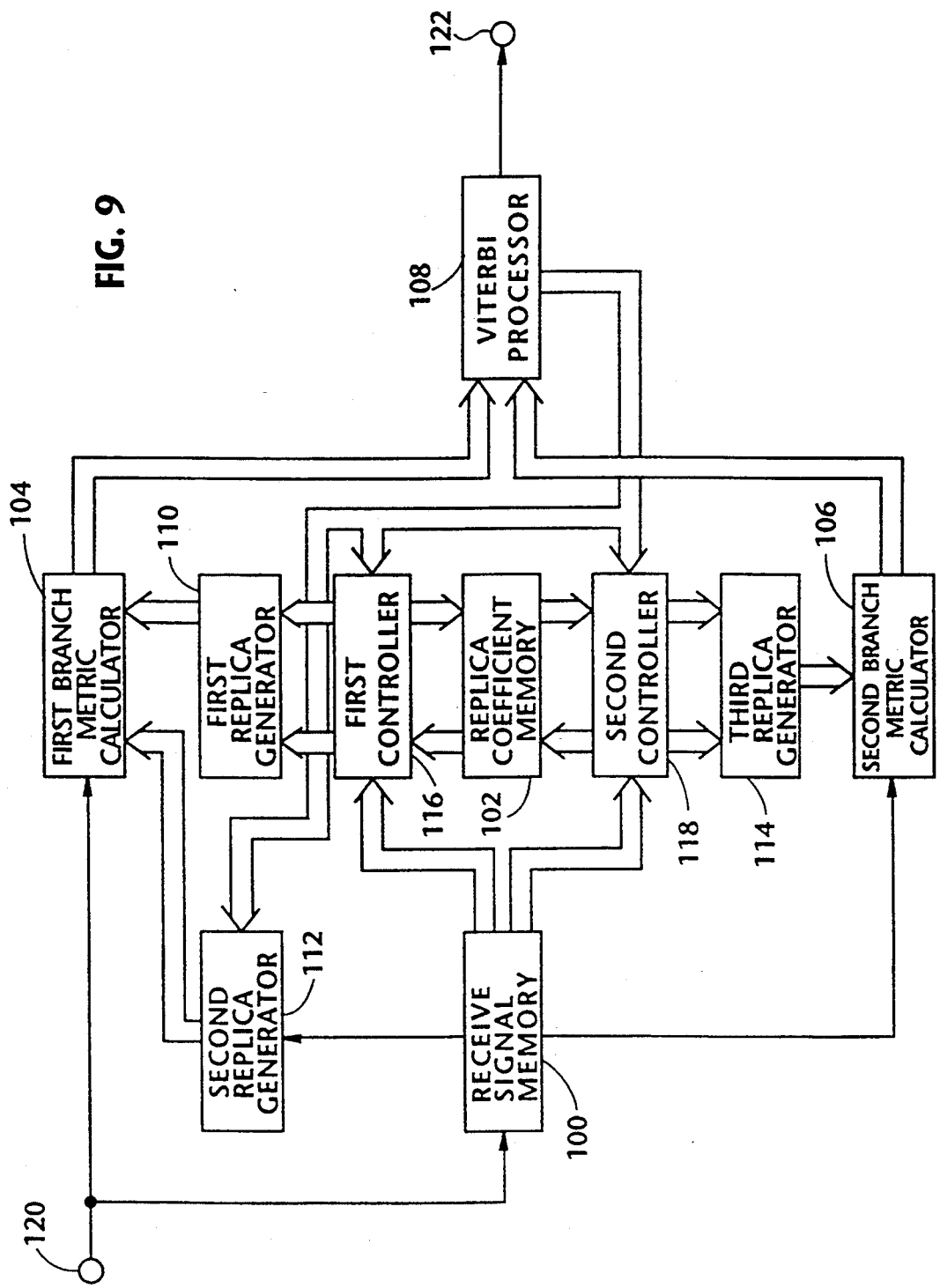
FIG. 9 is a block diagram showing the conceptual arrangement of a seventh embodiment whose purpose is essentially identical with that of the sixth embodiment of the invention.

FIG. 9 is a block diagram form showing a seventh embodiment of the present invention.

The seventh embodiment is a reduced-state type Viterbi estimator which operates in a manner similar to the sixth embodiment and which includes same functional blocks depicted by like numerals. However, the interconnection of the blocks 100-122 of the seventh embodiment is different from that of sixth embodiment as shown in FIG. 9.

The operation of the FIG. 9 arrangement will be known to those skilled in the art referring to the preceding first to fifth embodiments and, accordingly further descriptions thereof will be omitted.

It will be understood that the above disclosure is representative of several possible embodiments of the present invention and that the concept on which the invention is based is not specifically limited thereto.

What is claimed is:

1. A method of estimating a data sequence transmitted using a Viterbi algorithm, comprising the steps of:

(a) storing sampled values of incoming data at a predetermined time interval in a first memory;

(b) retrieving a plurality of sampled values from said first memory;

(c) retrieving a plurality of receive signal replica coefficients previously prepared and stored in a second memory;

(d) determining a plurality of receive signal replicas by multiplying said plurality of sampled values retrieved in step (b) by said plurality of receive signal replica coefficients retrieved in step (c);

(e) determining branch metrics using said sampled values of the incoming data and said plurality of receive signal replicas determined in step (d); and (f) estimating a data sequence using said branch metrics according to the Viterbi algorithm.

2. A method as claimed in claim 1, said plurality of sampled values and said plurality of receive signal replica coefficients are retrieved using survivor paths obtained using the Viterbi algorithm.

3. An apparatus for estimating a data sequence transmitted using a Viterbi algorithm, comprising:

a first memory (30) for storing a plurality of sampled values of incoming data at a predetermined time interval;

a second memory (32) for storing a plurality of receive signal replica coefficients which are used to determine receive signal replicas of all transitions branched from each state of a trellis diagram at a given time point;

a first controller (38) which receives said plurality of sampled values from said first memory and said plurality of receive signal replica coefficients from said second memory, in connection with a plurality of first set of states of a trellis diagram, said first controller producing a plurality of first pairs each consisting of a sampled value and a corresponding receive signal replica coefficient;

a second controller (40) which searches for, using history of survivor paths defined by a Viterbi algorithm, a plurality of sampled values from said first memory and a plurality of receive signal replica coefficients from said second memory both in connection with a plurality of second set of states of said trellis diagram, said second controller producing a plurality of second pairs each consisting of a sampled value and a corresponding receive signal replica coefficient;

a receive signal replica generator (42) which receives said plurality of first and second pairs and determines receive signal replicas in connection with said all transitions;

a branch metric calculator (34) which is coupled to receive said receive signal replicas and a plurality of sampled values of incoming data at said given time point and then determines branch metrics; and a Viterbi processor (36) which is coupled to receive said branch metrics and estimates a data sequence, said Viterbi processor outputting said history of survivor paths.

4. A Viterbi estimator for estimating a data sequence transmitted using a trellis diagram including reduced states, comprising:

a first memory (50) for storing sampled values of incoming data at a predetermined time interval;

a second memory (52) for storing a plurality of receive signal replica coefficients which are used to determine receive signal replicas resulting from all transitions branched from trellis diagram's reduced states at a given time point;

a replica calculation controller (58) which, when said replica calculation controller determines a non-singular state corresponding to a reduced state using history of survivor paths defined by a Viterbi algorithm, searches for a plurality of sampled values and a plurality of receive signal replica coefficients both related to the reduced state detected as a non-singular state, said replica calculation controller, when said replica calculation controller determines a singular state corresponding to a reduced state using the history of survivor paths, detecting a latest non-singular state on each of survivor paths defined by said Viterbi algorithm and then searching for a plurality of sampled values and a plurality of receive signal replica coefficients both related to the latest non-singular state detected, said replica calculation controller generating sampled values and receive signal replica coefficients which have been searched;

a receive signal replica generator (60) which receives said sampled values and said receive signal replica coefficients which are generated from said replica calculation controller, said receive signal replica generator determining receive signal replicas in connection with said all transitions of said trellis diagram including reduced states;

a branch metric calculator (54) which is coupled to receive said receive signal replicas and sampled values of incoming data and then determines branch metrics of said trellis diagram including reduced states; and a Viterbi processor (56) which is coupled to receive said branch metrics and estimates a data sequence, said Viterbi processor outputting said history of survivor paths.

* * * * *

UNITED STATES PATENT AND TRADEMARK OFFICE
CERTIFICATE OF CORRECTION

PATENT NO. : 5,450,445
DATED : September 12, 1995
INVENTOR(S) : Akihisa USHIROKAWA It is certified that error appears in the above-indentified patent and that said Letters Patent is hereby corrected as shown below:

Col. 5, line 32, delete "$r_k^t$", insert --$\vec{r}_k^{\,t}$--.

Col. 5, line 45, delete "$\hat{h}_{t,ls}$", insert --$\vec{\hat{h}}_{k,ls}$--.

Col. 7, line 10, delete "$s_{k+1}^t$", insert --$\vec{s}_{k+1}^{\,t}$--.

Col. 7, line 15, delete "sates", insert --states--.

Col. 8, line 30, delete "$c_{k+1}^t r_k$", insert --$\vec{c}_{k+1}^{\,t}\vec{r}_k$--.

Col. 8, line 49, delete "(1,1,0:0)", insert --(1,1,0:1)--.

Col. 9, line 42, delete "$\vec{S}_{k-m}^{-t}$", insert --$\vec{S}_{k+1}^{\,t}$--.

Col. 9, line 61, delete "stoked", insert --stored--.

Col. 11, line 52, delete "$h_{k+1}$", insert --$\hat{h}_{k+1}$--.

UNITED STATES PATENT AND TRADEMARK OFFICE
CERTIFICATE OF CORRECTION

PATENT NO. : 5,450,445
DATED : September 12, 1995
INVENTOR(S) : Akihisa Ushirokawa It is certified that error appears in the above-indentified patent and that said Letters Patent is hereby corrected as shown below:

Col. 11, line 52, delete "$h_{k+1}$", insert --$\hat{h}_{k+1}$--.

Signed and Sealed this

Thirty-first Day of December, 1996

Attest:

BRUCE LEHMAN

*Attesting Officer*    *Commissioner of Patents and Trademarks*